US012644392B2

(12) United States Patent
Debat et al.

(10) Patent No.: US 12,644,392 B2
(45) Date of Patent: Jun. 2, 2026

(54) AIRCRAFT TURBOMACHINE COMPRISING A BEARING SUPPORT HAVING AN IMPROVED DESIGN

(71) Applicant: SAFRAN HELICOPTER ENGINES, Bordes (FR)

(72) Inventors: Alexandre Debat, Moissy Cramayel (FR); Antoine Bernard Christophe, Moissy Cramayel (FR); Olivier Robert, Moissy Cramayel (FR); Sébastien Mathieu Combebias, Moissy Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/848,425

(22) PCT Filed: Mar. 31, 2023

(86) PCT No.: PCT/FR2023/050466
§ 371 (c)(1),
(2) Date: Sep. 18, 2024

(87) PCT Pub. No.: WO2023/194677
PCT Pub. Date: Oct. 12, 2023

(65) Prior Publication Data

US 2025/0215810 A1 Jul. 3, 2025

(30) Foreign Application Priority Data

Apr. 4, 2022 (FR) ....................................... 2203032

(51) Int. Cl.
*F01D 25/16* (2006.01)
*F01D 25/18* (2006.01)

(52) U.S. Cl.
CPC ........... *F01D 25/164* (2013.01); *F01D 25/18* (2013.01); *F05D 2220/323* (2013.01); *F05D 2240/54* (2013.01); *F05D 2260/96* (2013.01)

(58) Field of Classification Search
CPC ...... F01D 25/16; F01D 25/162; F01D 25/164; F16C 27/045; F05D 2260/96; F05D 2240/54; F05D 2220/323
See application file for complete search history.

(56) References Cited

U.S. PATENT DOCUMENTS 7,857,519 B2 * 12/2010 Kostka .................... F16C 27/04 384/535
8,322,038 B1 * 12/2012 Heidari ................. F01D 25/164 29/898.07

(Continued)

FOREIGN PATENT DOCUMENTS

EP 1 650 449 A1 4/2006
EP 3 124 752 A1 2/2017

(Continued)

OTHER PUBLICATIONS

International Search Report mailed on May 22, 2023 in PCT/FR2023/050466 filed on Mar. 31, 2023 (2 pages).

*Primary Examiner* — Elton K Wong
(74) *Attorney, Agent, or Firm* — Oblon, McClelland, Maier & Neustadt, L.L.P.

(57) ABSTRACT

An assembly for aircraft turbomachine, including a stator part, a first bearing, a second bearing and a support part in an oil enclosure delimited by an outer enclosure delimiting portion integral with the stator part, the support part including a first axial end portion forming an outer ring of the first bearing, or supporting such a ring; a second axial end portion forming an outer ring of the second bearing or supporting such a ring, a compression damping oil film being arranged between the second portion and the stator (Continued)

part; an intermediate ring, arranged axially between the first and second portions, and forming a flexible connection as well as an oil-spray protection element.

16 Claims, 6 Drawing Sheets

(56) References Cited

U.S. PATENT DOCUMENTS

| | | | | |
|---|---|---|---|---|
| 9,702,404 | B2 * | 7/2017 | Smedresman | F16C 27/045 |
| 10,436,065 | B2 | 10/2019 | DiBenedetto | |
| 2020/0309143 | A1 * | 10/2020 | Lefebvre | F01D 25/162 |

FOREIGN PATENT DOCUMENTS

| | | | |
|---|---|---|---|
| EP | 3 763 930 | A1 | 1/2021 |
| JP | 2010-38364 | A | 2/2010 |

* cited by examiner

AIRCRAFT TURBOMACHINE COMPRISING A BEARING SUPPORT HAVING AN IMPROVED DESIGN

TECHNICAL FIELD

The present invention relates to the field of aircraft turbomachines. More specifically, it relates to support and guiding systems for turbomachine drive shafts.

The invention applies to all types of aircraft, such as helicopters in particular.

PRIOR ART

Aircraft turbomachine drive shafts are guided in rotation by bearings. These bearings can be combined with oil film compression dampers, also referred to as "squeeze film dampers (SFDs)". This type of damper provides damping for flexible shafts operating at supercritical speeds. Unlike a conventional hydrodynamic bearing, the thin film between the bearing outer ring and a part of the stator is not sheared. As a result, the absence of shearing limits oil heating and eliminates instabilities.

The role of such a damper is to dampen the vibrations of the drive shaft caused by its rotation and by the imbalance of its mechanical loading. e.g. the unbalance. This principle of damping by compression of an oil film is known for example from EP 1 650 449 A1.

The outer ring of the damped bearing is usually secured to a flexible cage, referred to as a squirrel cage. This cage has apertures through it to provide the required flexibility.

It allows greater orbiting of the outer ring in the stator part that houses it, and thus ensures greater efficiency of the oil-film compression damper.

The flexible cage is generally surrounded by the stator part, which is susceptible to high temperatures in the hot zones of the turbomachine, e.g. at the rear of the machine, in an oil enclosure located at the level of the turbine(s).

During operation, the rotation of components located in the oil enclosure, such as rotating bearing elements and drive shafts, generates oil spray in the form of mist. To prevent this oil from being sprayed onto the hot wall of the stator section surrounding the flexible cage, by passing through the large openings of this cage, a part in the form of an annular anti-spray grid is integrated into the cage.

The installation of this additional part complicates the overall design of the assembly in an already highly dense environment. Furthermore, so that the flexible cage can retain its deformability, a radial clearance needs to be provided between the flexible cage bars and the annular grid. This clearance means that oil mist can pass through the axial ends of the free annular space between the cage and the grid, with the risk of oil being projected radially outwards against the hot wall of the stator section, passing through the large openings in the flexible cage.

As a result of the oil spraying onto the hot part of the stator, and despite the presence of the annular grid designed to limit this spray, the impacts cause forced convection-type heat exchange. This results in significant local rises in the oil temperature. These temperature rises are detrimental to the thermal balance of the oil, requiring oversized heat exchangers to cool the oil. In addition, excessive local oil temperatures generate rapid thermal oxidation of the oil, leading to problems of risks of coking.

DISCLOSURE OF THE INVENTION

In order to at least partially address the aforementioned problems relating to the prior art, the invention firstly relates to an assembly for an aircraft turbomachine, comprising a stator part, a second bearing, and a support part, the second bearing and the support part being arranged in an oil enclosure delimited radially outwards by an outer enclosure delimiting portion integral with the stator part, the support part comprising:

- a first axial end portion preferably intended to form an outer ring of a first bearing, or to support such a ring;
- a portion for securing the support part to the stator part, the securing portion being connected to the first axial end portion;
- a second axial end portion opposite the first axial end portion, and forming an outer ring of the second bearing or supporting such a ring, a compression-damping oil film being arranged between an outer surface of the second axial end portion and a corresponding surface of the stator part; and
- an intermediate ring, arranged axially between the first and second axial end portions, and forming a flexible connection between these same two axial end portions. Preferably, the intermediate ring, which is thus arranged axially between the first and second axial end portions, is apertured so as to form a flexible connection between these same two axial end portions.

According to the invention, the intermediate ring also forms an oil spray protection element, configured to prevent oil spraying from the inside of this intermediate ring against the outer enclosure delimiting portion.

In this way, the intermediate ring makes it possible to fulfil two functions through the same part. The first function is to provide flexible mechanical support for the second axial end portion associated with the damping oil film, while the second thermal function is to reduce the temperature of the oil, preventing it from impacting the outer enclosure delimiting portion, a potentially hot area of the turbomachine. Contrary to the prior art, in which two separate parts were required to perform these two functions, the second of which was not optimally performed, the invention advantageously merges these two parts into a single one, with the ring being apertured much more finely to avoid unwanted spraying of oil particles.

The configuration of the assembly is thereby simplified and the thermal function is improved.

Moreover, the invention has at least one of the following optional features, considered separately or in combination.

Preferably, the oil-spray protection element is traversed by orifices, each configured so that its smallest dimension is less than 5 mm.

According to a first preferred embodiment of the invention, the oil-spray protection element has successive orifices in a circumferential direction of the ring, as well as in an axial direction thereof, these orifices being preferably arranged in annular rows of axially successive orifices. In this case, the spray protection element is in the general form of a grid. The orifices are preferably circular, oval or oblong, or any other shape that is considered suitable.

According to a second preferred embodiment of the invention, the oil-spray protection element has successive orifices only in a circumferential direction of the ring, each orifice having the form of a slot extending from one axial end of the intermediate ring to the other.

In either embodiment, the protection element has orifices and solid portions delimiting these orifices, and the ratio between the cumulative surface area of the orifices and the total surface area of the protection element is between 0.2 and 0.5. For example, it may be in the order of 0.3 to 0.4.

Preferably, the portion securing the support part to the stator part is in the form of a securing flange, or a plurality of securing lugs distributed circumferentially around the first axial end portion of the support part.

Preferably, the outer enclosure delimiting portion, integrated with the stator part, has an oil recovery orifice at the bottom.

Preferably, the support part specific to the invention and described above, is made in one piece, for example by any additive manufacturing technique that provides the possibility of a complex geometry. However, other manufacturing techniques are also conceivable, for example by producing the support part in several portions that are fixed to one another, and/or by providing machining/drilling to produce the orifices of the protection element.

Another objective of the invention is an aircraft turbomachine comprising at least one such assembly, preferably arranged downstream of a combustion chamber of the turbomachine.

Preferably, the turbomachine comprises a first drive shaft guided by the first bearing, as well as a second drive shaft guided by the second bearing, the first and second shafts being concentric.

Other advantages and features of the invention will become apparent in the non-limiting detailed description below.

BRIEF DESCRIPTION OF THE DRAWINGS

This description is given with reference to the accompanying drawings wherein.

DESCRIPTION OF THE EMBODIMENTS

Figure 1:
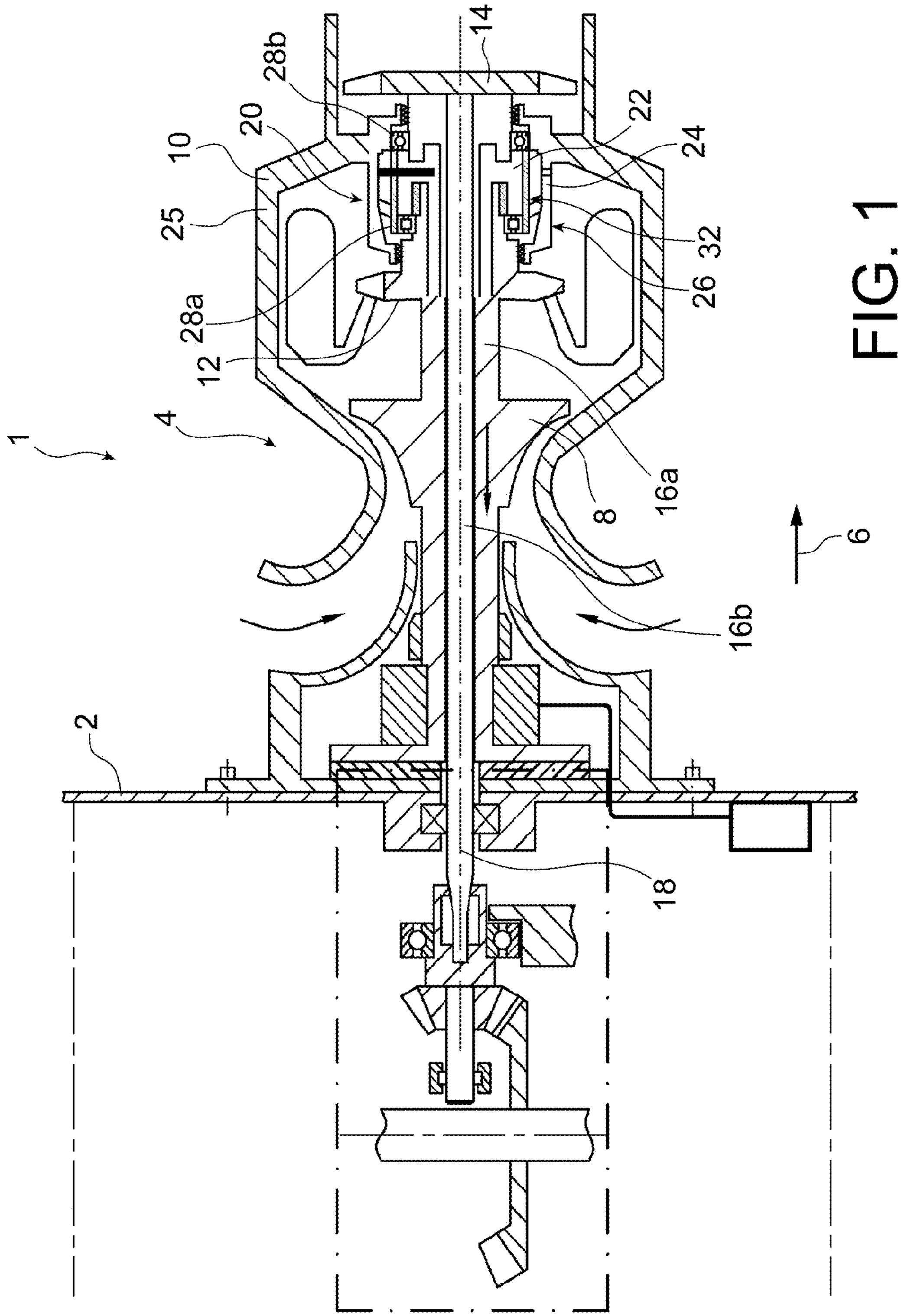
FIG. 1 shows a schematic axial sectional view of an aircraft turbomachine according to the invention.

Referring first of all to FIG. 1, a preferred embodiment of the invention is shown schematically, in the form of an aircraft turbomachine 1, in this case a helicopter.

The turbomachine 1 includes a main gearbox 2, designed to drive a rotating receiver (not shown), in this case helicopter blades. The main gearbox is connected to a gas generator 4 of the turbomachine, comprising, from upstream to downstream along a main flow direction 6 of gases through the turbomachine, a centrifugal compressor 8, possibly double-stage, a combustion chamber 10, a high-pressure turbine 12, and a free turbine 14, also referred to as a low-pressure turbine.

The compressor 8 and turbine 12 are connected by a drive shaft 16*a*, corresponding to a high-pressure shaft, while the free turbine 14 is connected to the downstream end of a free turbine shaft 16*b*, corresponding to a low-pressure shaft. The upstream end of this shaft 16*b* is connected to the main gearbox 2, which it penetrates to drive this gearbox. Hereinafter, the shafts 16*a*, 16*b* will be referred to as first and second drive shafts. They are concentric, centred on a central longitudinal axis 18 of the gas generator 4. Preferably, the first shaft 16*a* is located around the second shaft 16*b*.

The invention relates more precisely to an assembly 20 located at the rear of the turbomachine, being arranged wholly or partly downstream of the combustion chamber 10. The assembly 20 is preferably located between the two turbines 12, 14, and defines an oil enclosure 22 which is delimited radially outwards by an outer enclosure delimiting portion 24, this portion 24 belonging to a stator part 26 of the assembly 20. The stator part 26 is arranged axially between the two turbines, so that its outer enclosure delimiting portion 24 corresponds to an inter-turbine housing. The stator part 26, connected to the turbine housing 25, takes the form of a casing with its outer annular portion 24 surrounding the shafts 16*a*, 16*b*.

In the oil enclosure 22, the assembly includes a first bearing 28*a* and a second bearing 28*b* located downstream of the latter. The first bearing 28*a*, which is optional in implementing the general principle of the invention, but is retained in this preferred embodiment, is a roller bearing guiding the first motor shaft 16*a* in rotation, while the second bearing 28*b* is a ball bearing guiding the second motor shaft 16*b* in rotation. In the invention, it is this second bearing 28*b* that is associated with a "squeeze film damper" as detailed below.

Figure 2:
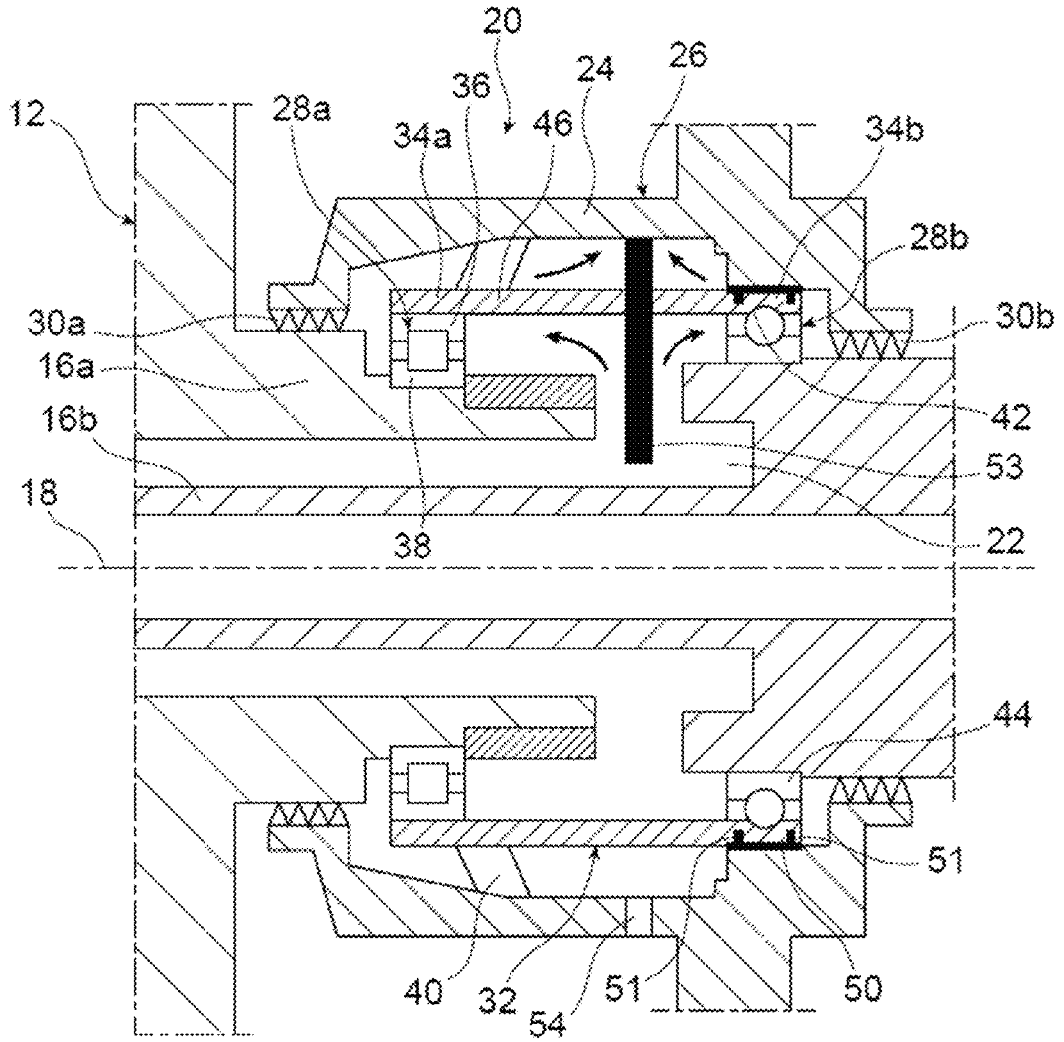
FIG. 2 shows an enlarged schematic axial sectional view of an assembly fitted to the rear part of the turbomachine shown in the previous figure, the assembly being in the form of a first preferred embodiment of the invention.
Figure 3:
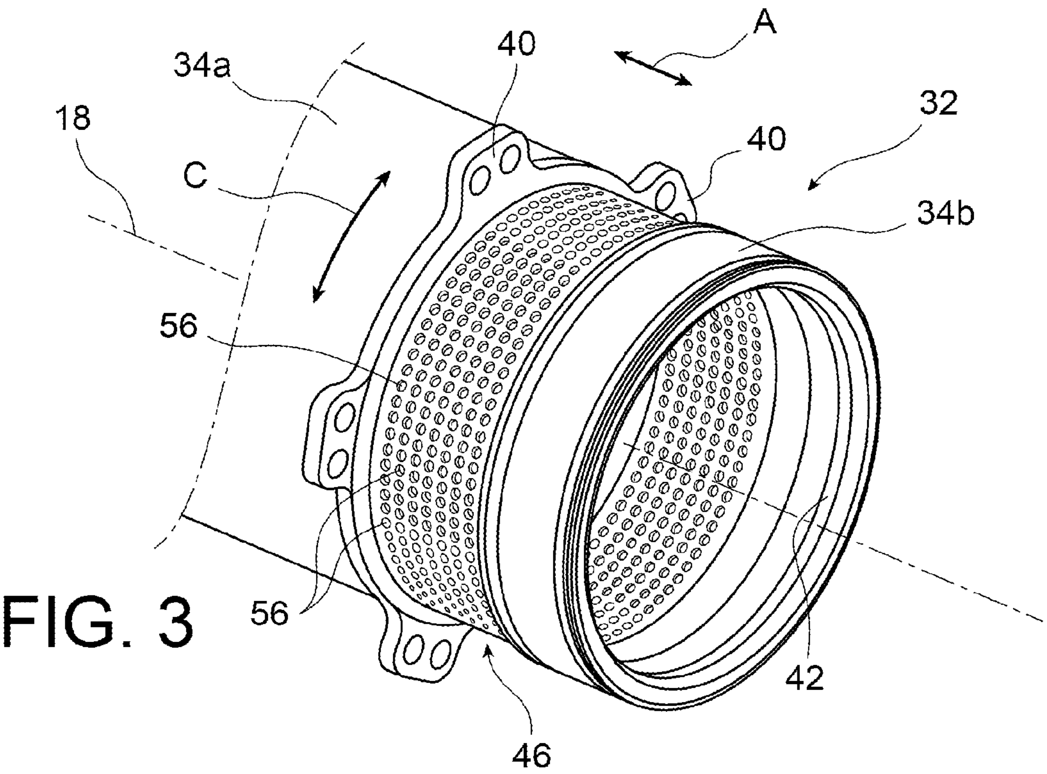
FIG. 3 is an enlarged perspective view of the support part fitted to the assembly shown in the previous figure.
Figure 4:
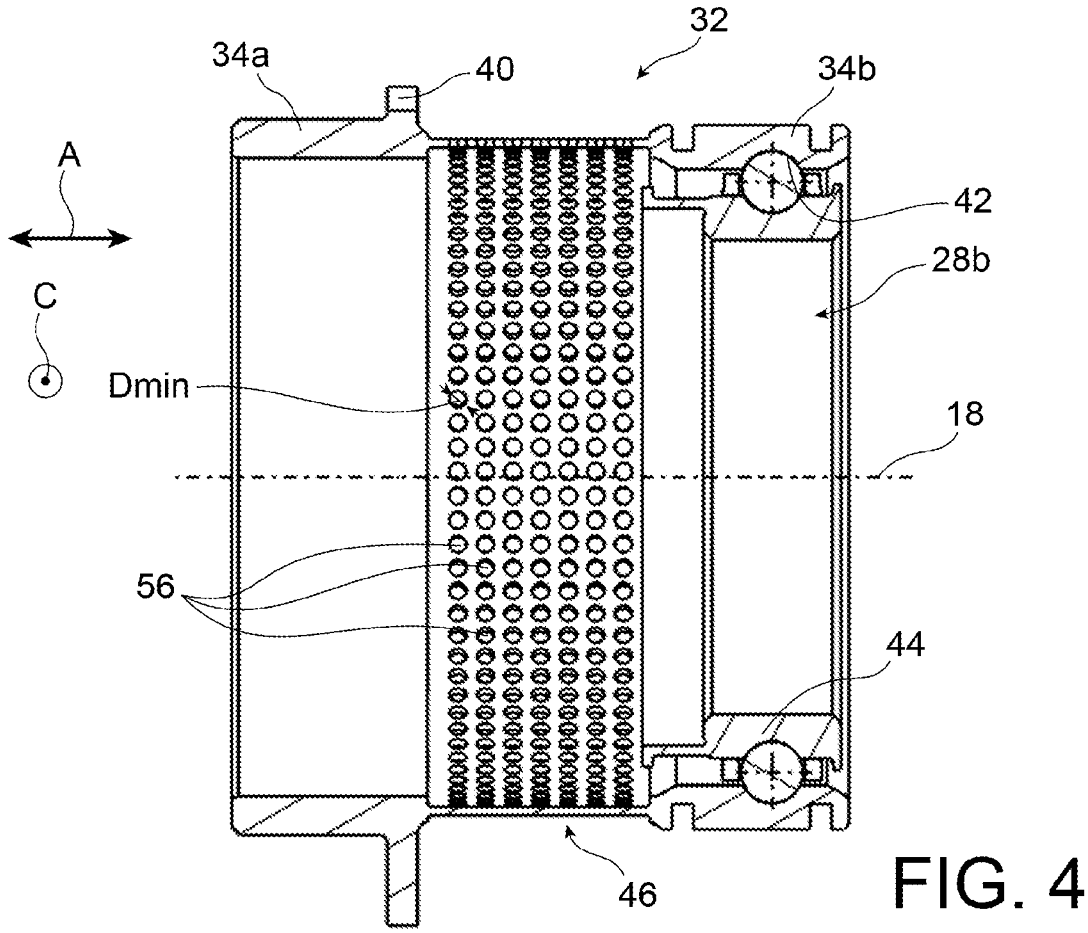
FIG. 4 is an axial sectional view of the support part shown in the previous figure.

As best shown in FIG. 2, upstream of the first bearing 28*a*, the oil chamber 22 is axially closed by a first seal 30*a*, for example of the labyrinth type and interposed between an upstream end of the outer annular portion 24 of the stator part 26, and an outer surface of the first shaft 16*a*. Similarly, downstream of the second bearing 28*b*, the oil chamber 22 is axially closed by a second seal 30*b*, for example of the labyrinth type and interposed between a downstream end of the outer annular portion 24 of the stator part 26, and an outer surface of the second shaft 16*b*.

Each of the two motor shafts 16*a*, 16*b* thus penetrates axially into the stator part 24 and into the oil enclosure 22, the latter also enclosing a support part 32 specific to the invention, a first embodiment of which is shown in FIGS. 1 to 4.

This support part 32 is preferably made in a single piece rather than by assembling several components, although the latter possibility is still conceivable. The one-piece part is made, for example, by any additive manufacturing technique, in a preferably metallic material, even if other conventional manufacturing techniques are still conceivable.

The support part 32 is generally annular and cylindrical, centred on the axis 18. It comprises the various elements described below:

- a first axial end portion 34*a* forming a support housing an outer ring 36 of the first bearing 28*a*, the inner ring of this bearing being supported externally by the first shaft 16*a;*
- a fastening portion 40 of the support part 32, on the outer annular portion 24 of the stator part 26. The fastening portion 40 is connected to the first axial end portion 34*a*, forming a plurality of fastening lugs 40 circumferentially distributed around a downstream end of the first axial end portion 34*a*, and preferably cooperating with stator lugs (not shown) projecting radially inside the enclosure 22 from the outer enclosure delimiting portion 24;
- a second axial end portion 34*b* opposite the first axial end portion 34*a*, forming an outer ring of the second bearing 28*b*, with an inner raceway 42 for the bearing balls. The inner ring 44 of the second bearing is supported externally by the second drive shaft 16*b*; and an intermediate ring 46 specific to the invention, arranged axially between the first and second axial end portions 34*a*, 34*b*, and forming a flexible connection between them.

The ring 46, which forms a flexible cage, is finely perforated so as to provide the required flexibility in mechanically holding the second axial end portion 34*b*. This second portion 34*b*, corresponding to the outer ring of the second bearing 28*b*, is in fact damped by a compression damping oil film 50, arranged in an annular space between an outer surface of this second portion 34*b*, and a corresponding surface of the outer annular portion 24 of the stator part 26.

The mechanical flexibility of the ring 46, combined with the damping oil film 50, effectively enables greater orbiting of the outer ring 34*b* in the stator part 26 that houses it, and thus ensures greater efficiency of the oil film compression damper. The latter is confined between two annular sealing tabs 51 spaced axially apart, and carried radially inwards by the outer annular portion 24 of the stator part 26.

Furthermore, it should be noted that the outer annular portion 24 of the stator part 26 is also traversed by one or more oil injectors 53 in the enclosure, these injectors approaching the shafts 16*a*, 16*b*, for example, as closely as possible.

In addition to providing the required flexibility for the ring 46, which is intended to centre the outer ring 34*b* of the second bearing 28*b*, this ring has the particularity of incorporating a second function of the thermal oil protection type. In fact, the intermediate ring 46 also forms an oil splash protection element, configured to prevent the splashing of enclosure oil from the inside of this intermediate ring, against the inner surface of the outer enclosure delimiting portion 24. In other words, the ring 46 has a certain porosity and is sufficiently finely perforated so that, during operation, oil mist particles projected radially outwards by the rotation of the shafts 16*a*, 16*b* and/or that of the rolling elements of the bearings 28*a*, 28*b*, are slowed/stopped by this protection element 46. The oil sprayed against the latter can then, of course, pass through this element, but its purpose in practice is to reduce the speed of the oil or even stop it altogether in order to prevent it from impacting the outer enclosure delimiting portion 24. After passing through the protective element, the oil may nonetheless come into contact with part of the inner surface of the outer enclosure delimiting portion 24, for example after having trickled onto the protective element and then fallen by gravity onto or close to a lower part of the stator housing featuring one or more oil recovery orifices 54. The contact of the oil with the inner surface of the outer enclosure delimiting portion 24 is therefore not effected by projection of this oil from the inside of the ring 46, but is mainly partial, as it only concerns part of the aforementioned inner surface. Due to this partial contact, with no oil sprayed onto the housing part, the increase in oil temperature by convection is advantageously contained. The risk of coking is thus reduced, and oil cooling requirements are reduced, necessitating smaller heat exchangers.

In the first preferred embodiment of the invention, the intermediate ring 46 is finely apertured, with successive orifices 56 in a circumferential direction "C" of the ring, as well as in an axial direction "A" thereof. In this way, orifices 56 are preferably arranged in annular rows of axially successive orifices, thus forming a grid-like, matrix-like anti-spray protection element. A staggered arrangement is also possible. Here, the orifices 56 of the protection element 46 are circular in shape, but other shapes can be used, without departing from the scope of the invention. To ensure the desired anti-spray function, while offering the required flexibility, the orifices 56 are small in size, and provided in high density. Also, each orifice 56 is configured so that its smallest dimension "Dmin". i.e. its diameter in the case of a circular shape where its dimension remains the same in all directions, is less than 5 mm. For example, this smallest dimension Dmin may be in the order of 2 mm. In addition, the density of orifices 56 within element 46 may be of the order of four to five orifices/cm$^2$.

Figure 5:
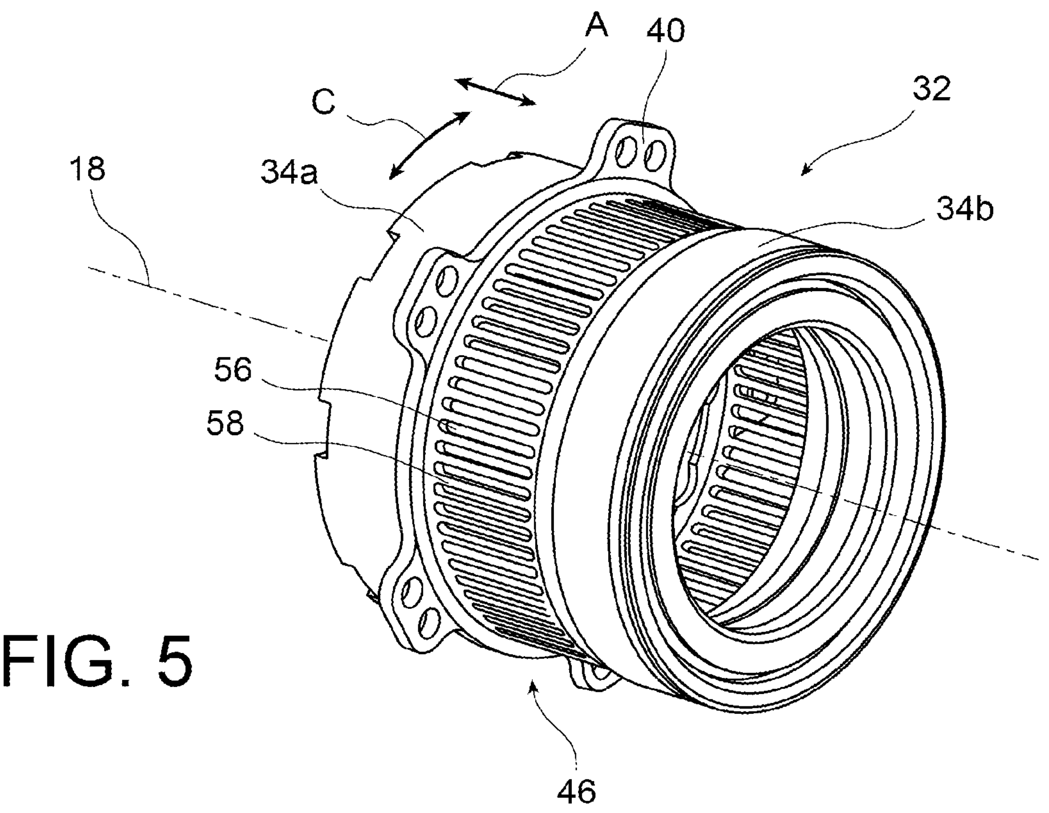
FIG. 5 is a perspective view similar to that of FIG. 3, with the part in the form of a second preferred embodiment of the invention.
Figure 6:
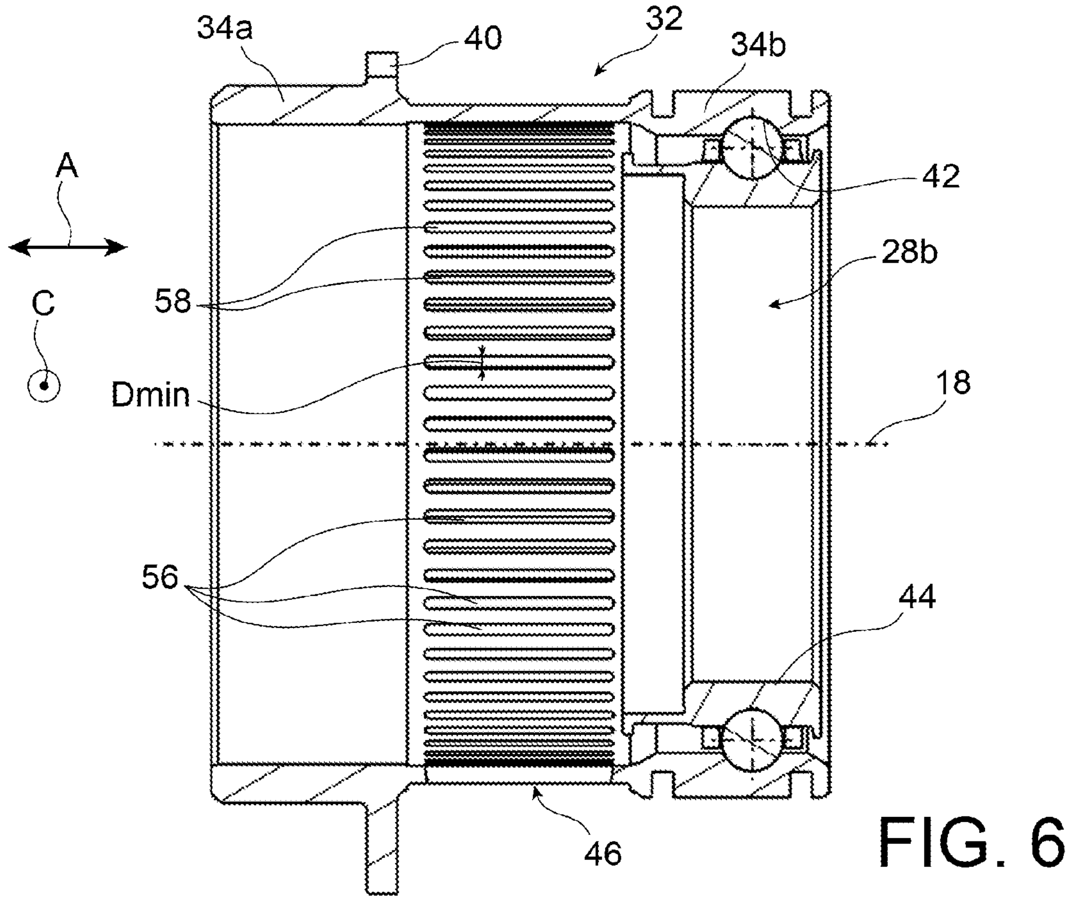
FIG. 6 is an axial sectional view of the support part shown in the previous figure.

A second embodiment is shown in FIGS. 5 and 6. It differs from the previous mode in that the orifices 56 of the protective element are successive only in the circumferential direction "C" of the ring, and no longer also in the axial direction "A". In this way, each orifice 56 has the shape of a slot extending continuously from one axial end of the ring 46 to the other in "A3" direction, preferably with a straight, purely axial shape as shown in FIGS. 5 and 6, or with a circumferential component, for example.

These orifices 56 are each configured so that their smallest dimension "Dmin". i.e. the slot width in circumferential direction "C", is less than 5 mm. It may for example be of the order of 1.5 mm.

In order to provide the required flexibility while maintaining the small aperture width indicated above and necessary for the oil anti-spray function, the solid, bar-like portions 58 remaining within element 46 preferably have a small cross-section. Moreover, the ratio between the cumulative surface area of the orifices 56 of this element and the total surface area of the latter including the orifices 56 and the bars 58, is preferably between 0.2 and 0.5, for example fixed at 0.4 in this preferred embodiment. This range of values for the proportion of the protective element's passage cross-section is also applicable to the first preferred embodiment described above, in which the ratio is set at 0.3, for example. As an indicative example, the passage cross-section provided by all orifices 56 is in the order of 2,000 mm$^2$.

Of course, various modifications may be made by the person skilled in the art to the invention as described, by way of non-limiting examples only, the scope of which is delimited by the appended claims. In particular, the turbomachine described above is intended for a helicopter, but it could alternatively be intended for aircraft propulsion.

The invention claimed is:

1. An assembly for an aircraft turbomachine, comprising:

a stator part, a second bearing, and a support part, the second bearing and the support part being arranged in an oil enclosure delimited radially outwards by an outer enclosure delimiting portion integral with the stator part, the support part comprising:

a first axial end portion;

a fastening portion of the support part on the stator part, the fastening portion being connected to the first axial end portion;

a second axial end portion opposite the first axial end portion, and forming or supporting an outer ring of the second bearing, a compression damping oil film being arranged between an outer surface of the second axial end portion and a corresponding surface of the stator part; and an intermediate ring, arranged axially between the first and second axial end portions, and forming a flexible connection between the same two axial end portions, wherein the intermediate ring further forms an oil spray protection element configured to prevent oil spraying from the interior of this intermediate ring against the outer enclosure delimiting portion, wherein the oil spray protection element includes orifices, a smallest dimension of each orifice being less than 5 mm, and solid portions delimiting said orifices, and wherein a ratio between a cumulative surface area of the orifices, and a total surface area of the protection element, is between 0.2 and 0.5.

2. The assembly according to claim 1, wherein the orifices of the oil spray protection element are successive orifices in a circumferential direction of the ring and in an axial direction of the ring, said orifices being arranged in annular rows of successive axial orifices.

3. The assembly according to claim 2, wherein the orifices of the oil spray protection element are circular, oval or oblong in shape.

4. The assembly according to claim 1, wherein the orifices of the oil spray protection element are successive orifices only in a circumferential direction of the ring, each orifice having a shape of a slot extending from one axial end of the intermediate ring to the other.

5. The assembly according to claim 1, wherein the fastening portion of the support part on the stator part includes a fastening flange, or a plurality of fastening lugs distributed circumferentially around the first axial end portion of the support part.

6. The assembly according to claim 1, wherein the outer enclosure delimiting portion, integrated with the stator part, has an oil recovery orifice at a bottom part.

7. An aircraft turbomachine comprising at least one assembly according to claim 1.

8. The aircraft turbomachine according to claim 7, wherein the aircraft turbomachine comprises a first drive shaft guided by a first bearing, and a second drive shaft guided by the second bearing, the first and second shafts being concentric.

9. An assembly for an aircraft turbomachine, comprising:

a stator part, a second bearing, and a support part, the second bearing and the support part being arranged in an oil enclosure delimited radially outwards by an outer enclosure delimiting portion integral with the stator part, the support part comprising:

a first axial end portion;

a fastening portion of the support part on the stator part, the fastening portion being connected to the first axial end portion;

a second axial end portion opposite the first axial end portion, and forming or supporting an outer ring of the second bearing, a compression damping oil film being arranged between an outer surface of the second axial end portion and a corresponding surface of the stator part; and an intermediate ring, arranged axially between the first and second axial end portions, and forming a flexible connection between the first and second axial end portions, wherein the intermediate ring further forms an oil spray protection element configured to prevent oil spraying from an interior of the intermediate ring against the outer enclosure delimiting portion, and wherein the oil spray protection element has successive orifices in a circumferential direction of the ring and in an axial direction of the ring, said orifices being arranged in annular rows of successive axial orifices.

10. The assembly according to claim 9, wherein a smallest dimension of each orifice is less than 5 mm.

11. The assembly according to claim 9, wherein the orifices of the protective element are circular, oval or oblong in shape.

12. The assembly according to claim 9, wherein the oil spray protection element includes solid portions delimiting said orifices, and wherein a ratio between a cumulative surface area of the orifices, and a total surface area of the oil spray protection element, is between 0.2 and 0.5.

13. The assembly according to claim 9, wherein the fastening portion of the support part on the stator part includes a fastening flange, or a plurality of fastening lugs distributed circumferentially around the first axial end portion of the support part.

14. The assembly according to claim 9, wherein the outer enclosure delimiting portion, integrated with the stator part, has an oil recovery orifice at a bottom part.

15. An aircraft turbomachine comprising at least one assembly according to claim 9.

16. The aircraft turbomachine according to claim 15, wherein the aircraft turbomachine comprises a first drive shaft guided by a first bearing, and a second drive shaft guided by the second bearing, the first and second shafts being concentric.

* * * * *